Dec. 20, 1960     W. J. ROBINSON     2,965,836

CAPACITIVE BALANCED SYSTEM

Filed June 5, 1957

*INVENTOR.*
WILLIAM J. ROBINSON

BY    *Joseph E Ryan*

ATTORNEY

United States Patent Office 2,965,836
Patented Dec. 20, 1960

2,965,836

CAPACITIVE BALANCED SYSTEM

William J. Robinson, Minneapolis, Minn., assignor to Minneapolis-Honeywell Regulator Company, Minneapolis, Minn., a corporation of Delaware Filed June 5, 1957, Ser. No. 663,646

1 Claim. (Cl. 323—93)

The present application is directed to a capacitive balanced system, and more specifically relates to a continuous power factor control system utilizing a conductive fluid capacitor and pump.

In many electrical systems it is desirable to utilize a continuously variable capacitor to balance or tune the system. Where the amount of capacitance needed for this operation is small, it is common to use air dielectric capacitors having relatively movable plates. This type of construction is common in the radio and electronics art and is quite satisfactory in the small sizes used. Where it becomes necessary to utilize substantial quantities of capacitance in an electric system, such as in a power factor control system, the use of continuously variable air dielectric capacitors becomes impractical. Building capacitors of the variable plate, air dielectric type becomes too bulky and structurally impractical. In these systems it has been common to utilize a plurality of fixed capacitors and appropriate switching mechanisms. More specifically, in power factor control systems, large banks of oil filled capacitors are utilized and are switched into and out of the system as the occasion arises. The switching is accomplished either manually or in steps in response to a power factor sensing device. It is obvious that this type of arrangement requires much complex mechanical equipment to provide the switching functions.

In addition to requiring complex mechanical systems, most power factor correction systems are called upon to switch relatively heavily inductive loads at substantial voltages. This makes the design of the switch contacts difficult and these switches, due to the arcing that occurs, require a substantial amount of maintenance for proper, trouble-free operation. It becomes apparent that if it would be possible to obtain a power factor control system which utilized a minimum of mechanical operations and which had no switching functions whatsoever a highly desirable system would be evolved.

The present invention is directed to just such a system and has been specifically disclosed as a power factor control system. It is obvious however, that the present application should not be limited to this sole type of system but that it is applicable to any type of electrical or electronic system which utilized a continuously variable capacitance. It is therefore an object of the present invention to provide a power factor control system that is continuously variable and which has no switching functions thereby having a minimum of moving parts.

Still another object is to disclose a continuously variable liquid metal capacitor used in a control system wherein the liquid metal forms the plates of one side of the capacitor and is moved by means of a pump to vary the capacitance in the system.

A further object is to disclose a variable capacitance control system wherein substantially the only moving member is a conductive fluid.

These and other objects will become apparent when the detailed disclosure is considered. In the present application a single sheet of drawings is utilized to disclose the invention, wherein.

Figure 1:
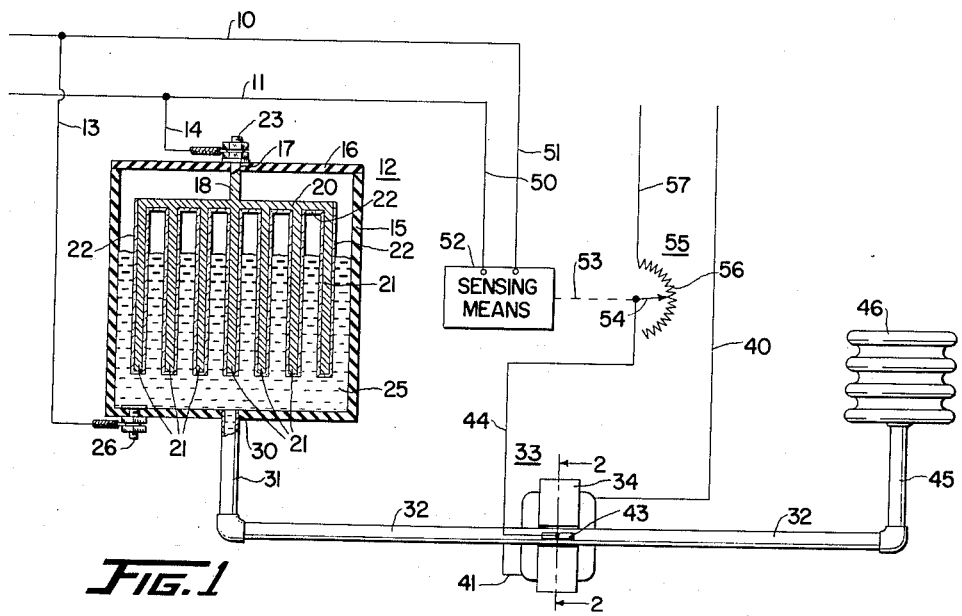
Figure 1 is a schematic representation of a capacitive controlled or balanced system.
Figure 2:
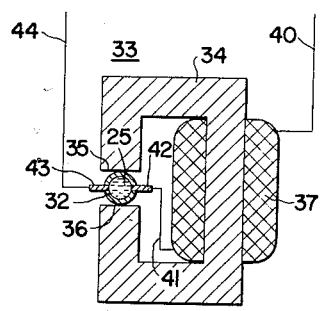
Figure 2 is a cross section along lines 2—2 of the pump utilized in the system.

In order to more fully understand the operation of the overall system the construction of and the principle of operation of two of the major components will be broadly explained. The first of these components is a conductive fluid capacitor. This type of capacitor is formed having one group of fixed, metallic capacitor plates which are in turn covered by a suitable dielectric material. The second plates of the capacitor are formed by a conductive fluid, more specifically a liquid metal. As the quantity of liquid is added to or subtracted from the capacitor unit the surface area of the liquid capacitor plates increases or decreases. By this arrangement the capacity of the overall unit can be readily, and continuously changed. It will be further understood that the conductive fluid which is used in the make-up of this type of capacitor can be of most any known formulation, but more specifically would be normally made or formulated of mercury, sodium, potassium, or a sodium-potassium alloy. Mercury and the sodium-potassium alloy are normally fluid at normal room ambients and therefore could be utilized conveniently in the average installation. Sodium and potassium become liquid at elevated temperatures and could be utilized in high temperature applications.

In moving the conductive fluid which is utilized in the conductive fluid capacitor a pump of unusual design can be utilized. This type of pump contains no mechanically moving parts but operates through the interaction of electric and magnetic fields upon the conductive fluid to propel the fluid through the pump. These types of pumps are normally referred to as electromagnetic pumps and can be broken into two general classes. The first class of pumps is the conductive or Faraday type. This type of pump can be operated on either alternating current or direct current and utilizes the induction motor principles for its operation. In this particular type of pump a current is caused to flow across a channel filled with a conductive fluid and this current is pendendicular to a magnetic field which is also caused to pass across the conductive fluid. Faraday found that under the joint action of mutually perpendicular currents and magnetic fields that a force created in a conductive fluid and that the fluid was propelled in the same manner as that normally considered in a pump.

The second type of conductive fluid pump is referred to as the induction type. In the pump a moving magnetic field induces currents in the conductive fluid and the reaction between the current and field which is induced causes a force to be exerted on the fluid. The fluid is then again pumped in much the same manner as the conventional fluid pump.

It will be understood that either of these types of electromagnetic pumps can be utilized with the conductive fluid or metals used in the present disclosure and that by their use the only moving element will be the fluid itself. The use of conventional types of pumps would introduce the complications of moving parts which can be avoided in the present system.

In the preferred embodiment of a power factor correction system shown in Figure 1, two alternating current power distribution conductors 10 and 11 are shown. The voltage between conductors 10 and 11 has a power factor which shifts depending on the load (not shown) connected at the left end of the conductors. A conductive fluid capacitor is generally shown at 12 and is connected by leads 13 and 14 to the power source to be controlled. It is understood that the capacitance between leads 13 and 14 must be continuously varied as the load on the conductors 10 and 11 varies to maintain a constant power factor. The capacitor 12 is composed of a non-conductive container 15 which may be of any insulated material such as plastic, glass, etc. The container 15 has a cover 16, also of a non-conductive material. Through a hole 17 in cover 16 is inserted a metallic shaft 18 which is joined to a horizontal metallic plate 20. The plate 20 has a plurality of vertical metallic plates joined thereto and which are each designated as 21. While the plates 21 are shown in cross section it is understood that they are flat rectangular like members having a relatively large surface area. All of the plates 21 are covered in their entirety by a coating of dielectric material 22. This dielectric material can be of any convenient type such as glass, porcelain, plastic, and so forth in accordance with the well known art of construction of capacitors. All of the conductive plates 21, the support plate 20 and the shaft 18 are joined to a terminal 23 which is in turn connected to the lead 14 and conductor 11.

The container 15 is partially filled with a conductive fluid 25, which is in the preferred embodiment a liquid metal of the sodium-potassium type. The sodium-potassium alloy is a highly conductive fluid at normal ambient temperatures, and relatively light in weight. The conductive fluid 25 fills the space between the plates 21 which are covered by the dielectric material 22 so as to form the second plates of the capacitor. These liquid plates of the capacitor are in contact with a terminal 26 which is in turn connected to lead 13 and power source conductor 10. It therefore becomes apparent that the capacitor plates are connected directly across the voltage source 10 and 11 and that any variance in the capacitance between these plates is reflected on the two conductors 10 and 11. It is further evident that as the level of the conductive fluid 25 raises or lowers that the surface area of the effective plates of the capacitor disclosed is varied.

Connected to the bottom 30 of the container 15 is a pipe 31. The pipe 31 is a fluid conduction means for supplying or removing the conductive fluid 25 from the tank 15 and thereby provides a means for changing the capacitance. Pipe 31 is in turn connected to pipe 32 which is connected through a pump generally shown at 33. The pump shown at 33 is of the electromagnetic type. This pump has a C shaped magnetic structure 34 which has poles 35 and 36 on opposite sides of the tube or pipe 32. Encircling the magnetic structure 34 is an energizing coil 37 which has leads 40 and 41. The lead 41 of coil 37 passes to an electrode 42 which is inserted in the side of pipe 32 and is in contact with the conductive fluid 25 contained in pipe 32. Directly opposite electrode 42 is an electrode 43 which also is inserted into pipe 32. Joined to electrode 43 is conductor 44. In the simplest embodiment of the pump disclosed at 33 the pipe is composed of a non-conductive type of material. It should be understood however that this pipe may be composed of a metallic material whose conductivity is substantially less than that of the fluid contained in the pipe. If the conductivity of the pipe 32 is substantially less than the conductivity of fluid 25 little current will pass through the pipe as opposed to the current which passed through the conductive fluid 25.

It will be appreciated that if a current flows from conductor 40 through coil 37 and in turn through the conductive fluid by means of conductors 41 and electrodes 42 and 43 that the two conditions for the creation of an electromagnetic pump have been obtained. A flux will be generated which will exist in the magnetic structure 34 and in turn pass across the poles 35 and 36 thereby providing a magnetic field perpendicular to the current path between electrodes 42 and 43. This combination of flux and current thereby provide a propelling force in the conductive fluid 25 and the fluid will therein be moved. It should be further appreciated that as the current supply to conductors 40 and 44 is varied, the pumping pressure varies substantially directly therewith.

The pipe 32 extends out of the right hand side of pump 33 and is connected to a pipe 45. The pipe 45 is in turn connected to a reservoir generally shown at 46. This reservoir has been specifically disclosed as a sealed chamber which is in the form of a bellows. It will be appreciated that the reservoir 46 can expand and contract with movements of the conductive fluid in and out thereof. It should be further understood that the reservoir 46 could be a container of fixed volume open to the atmosphere (where fluids are used which do not react with the atmosphere). The reservoir 46 could also be a fixed reservoir which was large in capacity as compared to the total amount of fluid used and which had an inert gas or fluid covering the surface of the conductive fluid 25. The walls of the bellows or the trapped gas act as a return spring for the system. The details of construction can be readily interchanged at the desire of those versed in the art.

Connected to power lines 10 and 11 are two conductors 50 and 51 which are in turn connected to a sensing means 52. The sensing means 52 would be of the power factor meter type which are well known to those versed in the art and which are unnecessary to detail herein. The sensing means 52 would be responsive to the power factor of the power lines 10 and 11 and further has a mechanical output on shaft 53. The shaft 53 in turn operates the wiper 54 of a potentiometer generally shown at 55. The potentiometer 55 has a winding 56. The wiper of potentiometer 55 is connected to lead 44 of the pump generally shown at 33. The winding 56 of potentiometer is in turn connected to an additional lead 57. If the lead 57 and lead 40 of the conductive fluid pump 33 are connected to a source of direct or alternating current and it is apparent that a source of variable power is provided for the pump 33. As the output of the sensing means 52 varies, the shaft 53 will in turn move the wiper 54 of potentiometer 55. By so moving the location of the wiper 54 with respect to the winding 56 a variable amount of power is supplied to the pump 33 by means of the conductors 40 and 44. The power supplied to conductors 40 and 57 can come from an independent source (not shown) of alternating or direct current, or could be supplied by extensions of the conductors 10 and 11. The selection of the power source for conductors 40 and 57 is optional and can be selected to suit the particular application to which the device is placed.

In overall operation it becomes apparent that the power factor of the power source connected to lines 10 and 11 can be readily varied by shifting the conductive fluid 25 from the tank 15 to the reservoir 46. If the shift of the conductive fluid is continuously made in response to a power factor sensing means 52 it can be seen that a constant power factor can be maintained across the conductors 10 and 11. With the system which has been described in detail above it is obvious that the only moving parts are the conductive fluid 25 and the mechanical linkage between the sensing means 52 and the potentiometer 55. Many modifications of this system could be envisioned, one of which would be the use of an electronic sensing means and the substitution of the saturable reactor for the potentiometer 55. With this type of combination, the mechanical operation between sensing means 52 and the potentiometer 55 could be eliminated and the sensing function and the control of current to the conductive fluid pump 33 could thereby be accomplished without any moving parts. This would leave a unit which would be capable of varying the capacity in a system by means of the movement of the conductive fluid alone and which would have no other moving parts whatsoever. This type of an arrangement would be very desirable in power factor control as no switching function would be necessary and a continuous modulation of the capacitance would be available. This would give a continuous and constant power factor and would be adaptable to systems of large and small capacity alike.

The present disclosure has been directed specifically to a power factor correction system and has been representative only of a single possible embodiment. The application of the principles disclosed to numerous other types of systems and devices would be obvious to those skilled in the art and the applicant wishes to be in no way limited by the details set forth. The applicant wishes only to be limited by the scope of the appended claim.

I claim as my invention:

In combination: conductive fluid capacitor means having a chamber and a capacitor plate therein which cooperates with the conductive fluid therein to provide a variable capacity depending upon the amount of fluid in said chamber; a reservoir providing a further chamber for said conductive fluid; conduit means connecting said chambers, one of said chambers acting to bias said fluid towards said other chamber; a conductive fluid pump disposed in said conduit and providing a continuously open passage therethrough; means associated with said pump to subject the fluid therein to conductive and magnetic effects such as to produce a force tending to move said fluid from one chamber towards the other against said biasing effect to thereby vary the amount of fluid in the chamber of said fluid capacitor means to vary the capacity thereof; said pump normally exerting just enough force on said fluid to balance said biasing effect and maintain said fluid in said capacitor means at a level providing the desired capacity; and means for varying at least one of said conductive and magnetic effects of said pump to change the force exerted by said pump sufficiently that the biasing effect is balanced when the fluid is at a different level at which the capacity of said capacitor means has a different desired value.

References Cited in the file of this patent

UNITED STATES PATENTS

| | | |
|---|---|---|
| 918,257 | Babcock | Apr. 13, 1909 |
| 992,852 | Cheyney | May 23, 1911 |
| 1,108,793 | San Martin | Aug. 25, 1914 |
| 1,241,566 | Simmon et al. | Oct. 2, 1917 |
| 2,611,030 | Sontheimer | Sept. 16, 1952 |
| 2,655,107 | Godbold | Oct. 13, 1953 |